United States Patent [19]

Sielemann

[11] 4,209,950
[45] Jul. 1, 1980

[54] GRINDING MACHINE

[76] Inventor: Hans Sielemann, Winkelstrasse 32-34, 4980 Bünde, Fed. Rep. of Germany

[21] Appl. No.: 849,332

[22] Filed: Nov. 7, 1977

[30] Foreign Application Priority Data

Nov. 13, 1976 [DE] Fed. Rep. of Germany ....... 2651879

[51] Int. Cl.² .......................................... B24B 55/02
[52] U.S. Cl. ..................................... 51/267; 51/209 R
[58] Field of Search ............................ 51/267, 209 R

[56] References Cited

U.S. PATENT DOCUMENTS

| 1,600,054 | 9/1926 | MacLaughlin et al. | 51/267 |
| 1,797,526 | 3/1931 | Hoagland | 51/209 R |
| 3,171,237 | 3/1965 | Howard | 51/209 R |
| 3,754,355 | 8/1973 | Hanchett | 51/209 R |

FOREIGN PATENT DOCUMENTS 2622440 12/1977 Fed. Rep. of Germany ............ 51/267

Primary Examiner—Othell M. Simpson
Assistant Examiner—Roscoe V. Parker
Attorney, Agent, or Firm—Stevens, Davis, Miller & Mosher

[57] ABSTRACT

A grinding machine having a rotatable grinding head formed of a circular array of grinding segments including means for conducting liquid coolant thereto, with a blocking member for interrupting flow of coolant to regions of the grinding head not in contact with a workpiece being machined.

23 Claims, 5 Drawing Figures

GRINDING MACHINE

BACKGROUND

The present invention relates to a grinding machine having a rotatable, substantially circular segmented head which receives grinding segments on its circumference, as well as a cooling-water feed, extending to the inner side of the grinding segments.

The invention relates in particular, but not exclusively, to surface grinding machines with a vertical drive shaft which receives the segmented head at its lower end, the grinding segments being fastened to the circumference of said head. As prior art, reference is made to German Patent Application (unexamined) No. 22 48 174.9 U.S. Pat. No. 1,797,526 and Swiss Pat. No. 242 897.

Heavy-duty grinding machines having a drive power of for instance, up to 200 kW operate today with a volume, per unit of time, of metal removed which makes it possible to eliminate prior planing and milling operations and to complete a workpiece directly on a grinding machine. Such high drive powers can, however, be meaningfully employed only if sufficient cooling and lubrication are provided. Otherwise, losses in quality of the workpiece can occur as a result of excessive thermal stressing of the workpiece and the pores of the grinding segments can become clogged by abraded material and thus impair the effectiveness of the grinding segments.

For this reason it is of particular importance that cooling water be fed, in the largest quantities possible directly into the region between the workpiece and the grinding segments. Due to the considerable speed of rotation of the segment head, there is the danger that the cooling water fed will become eddied and form a mist which is subject to considerable resistance to flow and therefore can be fed only at a low rate of passage.

Applicant's aforementioned German patent application No. 22 48 174.9 provides substantial improvements along this line. The object of the invention is further to increase the feed of cooling water to the working region.

BRIEF DESCRIPTION OF THE INVENTION

The invention is based on the idea of utilizing the forces which act on the water when the water is transferred from a fixed part of the machine to the grinding segments which are turning at considerable speed of rotation, in order to obtain a optimal guiding of a stream of water which is as consistent and directed as possible.

In accordance with a preferred embodiment of the invention, a barrier device is provided for interrupting the feed of cooling water in the regions of the segment head which lie to the side of a workpiece during machining thereof. In this way the result is obtained that no undesired loss of pressure and of water is obtained in the regions lying outside the workpiece, and the cooling water fed is used directly at the place where it is required. The grinding width, depending on the workpiece, is customarily preferably within the range of about 60 to 80% of the diameter of the grinding head. With the provision of the barrier device it may be necessary to provide for a certain lead angle.

In a preferred embodiment of the invention in which the cooling-water feed comprises an annular chamber arranged within the circle of the grinding segments and a plurality of water channels extending radially from said chamber outwards to the inner side of the grinding segments, a barrier diaphragm of circular segment shape is provided to close the water channels in the regions lying to the side of the workpiece. The position of the barrier device is preferably adjustable circumferentially with respect to the grinding machine. The barrier diaphragm is preferably arranged on a sleeve which is concentric to the axis of the drive shaft and defines the inner side of the annular chamber. Two concentric sleeves having barrier diaphragms which overlap each other and which permit a change in the length of the barrier region can also be provided. Furthermore, barrier diaphragms which are located diametrically opposite each other can be used, if the segment head extends beyond the working surface on both sides. The sleeve may be provided on one of its circumferential surfaces, and particularly on its inner circumferential surface, with a gear-rim section in which there engages a pinion which is turnable in order to displace the sleeve with respect to the grinding machine.

Another important feature of the invention resides in forming the annular chamber for the feeding of the cooling water of an upper annular space, which is limited towards the outside by a sleeve which is fixed on the machine, and a lower annular space which is limited towards the outside by an upward-extending ring of the segment head on whose inner surface circumferentially spaced blades are provided. These blades serve to accelerate the cooling water in the circumferential direction within the annular space. The blades are preferably approximately rectangular, as seen in horizontal cross section, and extend obliquely downward in a direction opposite to the direction of rotation. As a result, the cooling water, upon its acceleration in the circumferential direction, is forced positively downward in the direction towards the water channels. Furthermore, the blades can extend obliquely downward and inward in the direction towards the axis of rotation, so that a uniform acceleration is obtained an unnecessary resistance is avoided.

The outer wall of the annular space which lies within the segment head preferably extends obliquely downward and outward. The water channels extend obliquely downward and outward from the bottom of the lower annular space. The blades are arranged in each case directly behind the water channels, as seen in the direction of rotation, so that the water is positively forced by the blades into the water channels.

Another essential object of the invention resides in improving the guiding of the water on the inner surfaces of the grinding segments. For this reason, each grinding segment is provided on its inner surface with a pressure chamber having the shape of an obtuse triangle, as seen in horizontal cross section, the apex line of which lies in front of the center of the pressure chamber, as seen in the direction of rotation. The water channels discharge in the forward region of the pressure chambers and the cross section of the pressure chamber widens increasingly downward and outward.

As a result of this widening, the cooling water is positively forced downward by the centrifugal force. Furthermore, the water pocket present in the pressure chamber is subjected, as a result of the centrifugal force, to an acceleration in radial direction which, in practice, can correspond, for instance to 160 times the acceleration of gravity. This acceleration increases from the top to the bottom within the pressure chamber since on the one hand the radius increases with respect to the axis of rotation and thus the acceleration also increases, it being a function of the radius in accordance with the equation $b_f = r \times \omega^2$ and on the other hand the height of the "water column" and thus the hydrostatic pressure in the radial direction are increased. This increase of the pressure in the radial direction from the top to the bottom is desirable since the amount of water which passes through the porous grinding segments with a horizontal component as a result of the centrifugal force and a vertical component as a result of the acceleration due to gravity is dependent on the pressure. In the upper region of the grinding segments, the passage of a large amount of water is not necessary and therefore undesired, while it is required in the lower region of the grinding segments in order to wash out the pores of the grinding segments.

The edges of the pressure chambers which are triangular in cross section are preferably rounded off and pulled inwards in arcuate shape at the places of transition into the inner surface of the grinding segments. This results in a particularly good guidance of the water in the downward direction. In order further to improve this guidance, grooves which extend from the top to the bottom can be provided in the inner surface of the pressure chambers.

The water channels preferably discharge in the forward region of the pressure chambers so that, as a result of the increase in circumferential speed in the radial direction, the water is forced into the pressure chambers obliquely and against the direction of rotation. The fundamental features of the invention, and in particular the blocking of the feed of cooling water outside the grinding region, the use of acceleration blades within the annular space, and the use of pressure chambers within the segments, cooperate in a particularly advantageous manner in the guiding of the cooling water to the working region. However, they also represent, individually, considerable improvements.

BRIEF DESCRIPTION OF THE DRAWINGS

Several preferred embodiments of the invention will be described in further detail below with reference to the accompanying drawings, in which.

DETAILED DESCRIPTION

Figure 1:
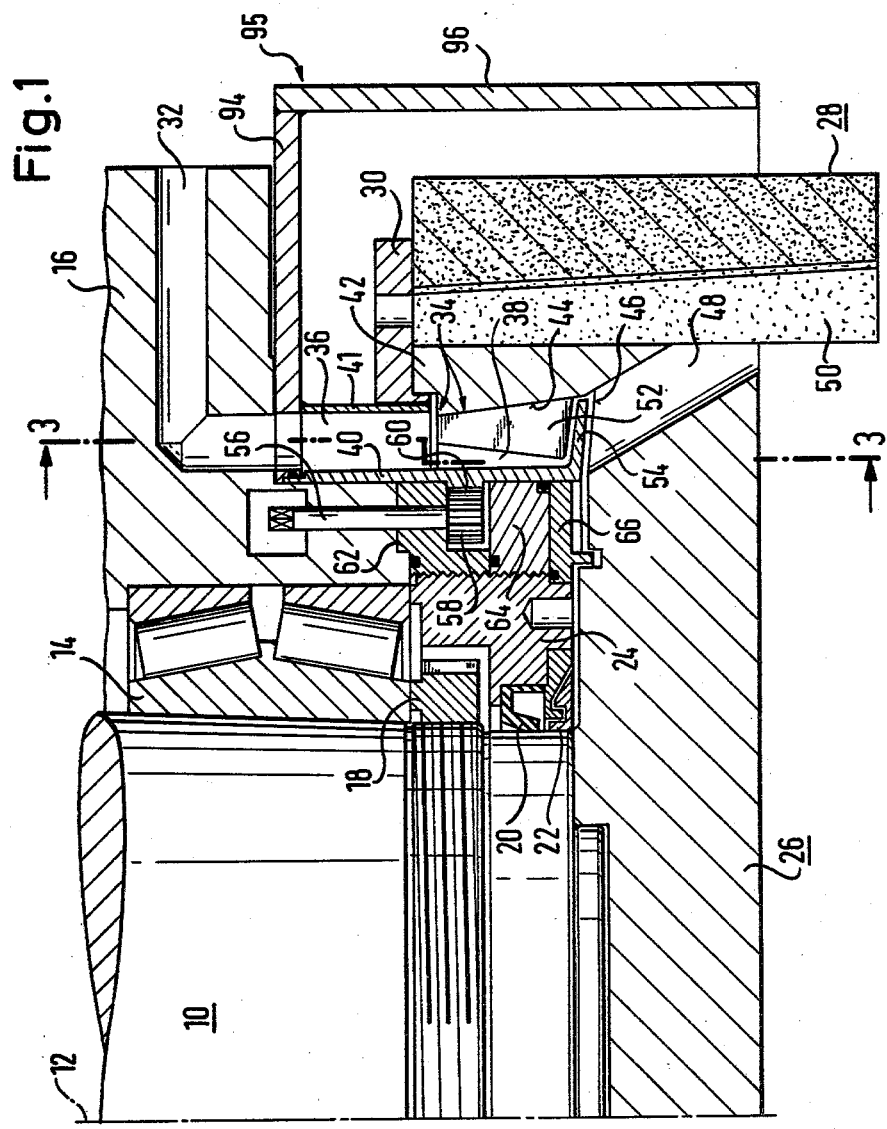
FIG. 1 shows a diagrammatical vertical section through one side of the lower end of the drive shaft and of the segment head with accessories.

In FIG. 1, a drive shaft 10 having a vertical axis of rotation 12 is shown. The drive shaft 10 is driven by a motor, which is not shown in the drawing. The lower end of the drive shaft is supported in a roller bearing 14, which in turn rests in a stationary machine part 16. The lower end of the drive shaft 10 and the associated inner race of the roller bearing 14 are slightly conical, and the drive shaft 10 and the roller bearing 14 are clamped together by a nut 18, which is screwed onto the lower, threaded end of the drive shaft 10.

An adjustment nut 24 supports the outer race of the roller bearing 14 with respect to the stationary machine part 16 and contains within it a radial packing ring 20 and a labyrinth seal 22 which seals off the lower end of the drive shaft 10. The external thread of the adjustment nut 24 engages an internal thread of a ring 62 which is firmly connected to the machine part 16 and which will be described in further detail later. On the external thread of the adjustment nut 24 there is furthermore screwed a lock ring 64 with internal thread which holds the adjustment nut 24 in the selected position thereof. Another ring 66 covers the lock ring 64. The rings 62, 64, 66 are sealed from each other by seals, which are not shown in detail.

A segment head 26 is fastened, in a manner not shown in detail, to the lower end of the drive shaft 10, said segment head 26 being provided on its circumference with grinding segments 28, as will be explained later with reference to FIG. 2. The grinding segments 28 rest on top against circumferential ring 30 which is fastened, in a manner not shown in detail, on the upper side of the segment head 26.

The feeding of the cooling water is effected by a pump (not shown) through a channel 32 which initially extends horizontally and then vertically in the stationary machine part 16, from which the channel 32 emerges in a downward direction. Adjoining the bottom of the channel is an annular chamber 34 which extends around the entire machine part 16. The annular chamber 34 comprises an upper annular space 36 and a lower annular space 38. The two annular spaces are limited on the inside by a sleeve 40 which is attached firmly to the machine and which will be described in further detail later. The upper annular space 36 is also defined towards the outside by a sleeve 41 which is firmly attached to the machine and is fastened to a protective hood 95 secured to the machine. The protective hood 95 comprises a horizontal cover plate 94 and a cylindrical outer wall 96. The lower annular space 38, on the other hand, is limited towards the outside by an upwardly extending ring 42 of the segment head 26 so that the cooling water comes into contact with a rotating machine part within the lower annular space 38. The outer wall 44 of the lower annular space 38, which wall is formed by the ring 42, extends obliquely outward and downward so that the cooling water is forced downward by the centrifugal forces produced. Water channels 48 extend obliquely outward and downward from the bottom 46 of the lower annular space 38, said water channels emerging from the segment head 26 in each case opposite a pressure chamber 50, in the grinding segments 28.

Within the lower annular space 38, on its outer wall 44, there are provided blades 52, the free edges of which extend obliquely downward and inward, in accordance with FIG. 1. These blades 52 serve to accelerate the water in the circumferential direction in the lower annular space 38. The oblique downward and inward course serves to prevent excessive resistance of the water and to accelerate the water increasingly in the circumferential direction with increasing downward movement. These blades will be described in further detail below.

FIG. 1 shows also the aforementioned sleeve 40 which forms the inner limitation of the annular chamber 34. This sleeve is fixed to the machine, but is adjustable in the circumferential direction. At its lower end it has a barrier diaphragm 54 of circular-segment shape, which extends substantially at a right angle radially outwards from the sleeve 40 and extends over the water channels 48, thus blocking them. The sleeve 40 is adjusted in the circumferential direction so that the barrier diaphragm 54 covers those water channels 48 which lie in each case to the side of the grinding region. In this way an unnecessary emergence of water from the annular chamber 34 is prevented. As is any unnecessary decrease in pressure as a result thereof. The adjusting of the barrier diaphragm 54 into the desired region is effected, in the diagrammatically indicated manner, by means of an adjustment shaft 56 which is connected with a pinion 58, which in its turn engages in a gear-rim section 60 on the surface of the sleeve 40. The pinion 58 is supported in the ring 62 which is fastened to the machine from which the adjustment shaft 56 enters the machine part 16.

Figure 2:
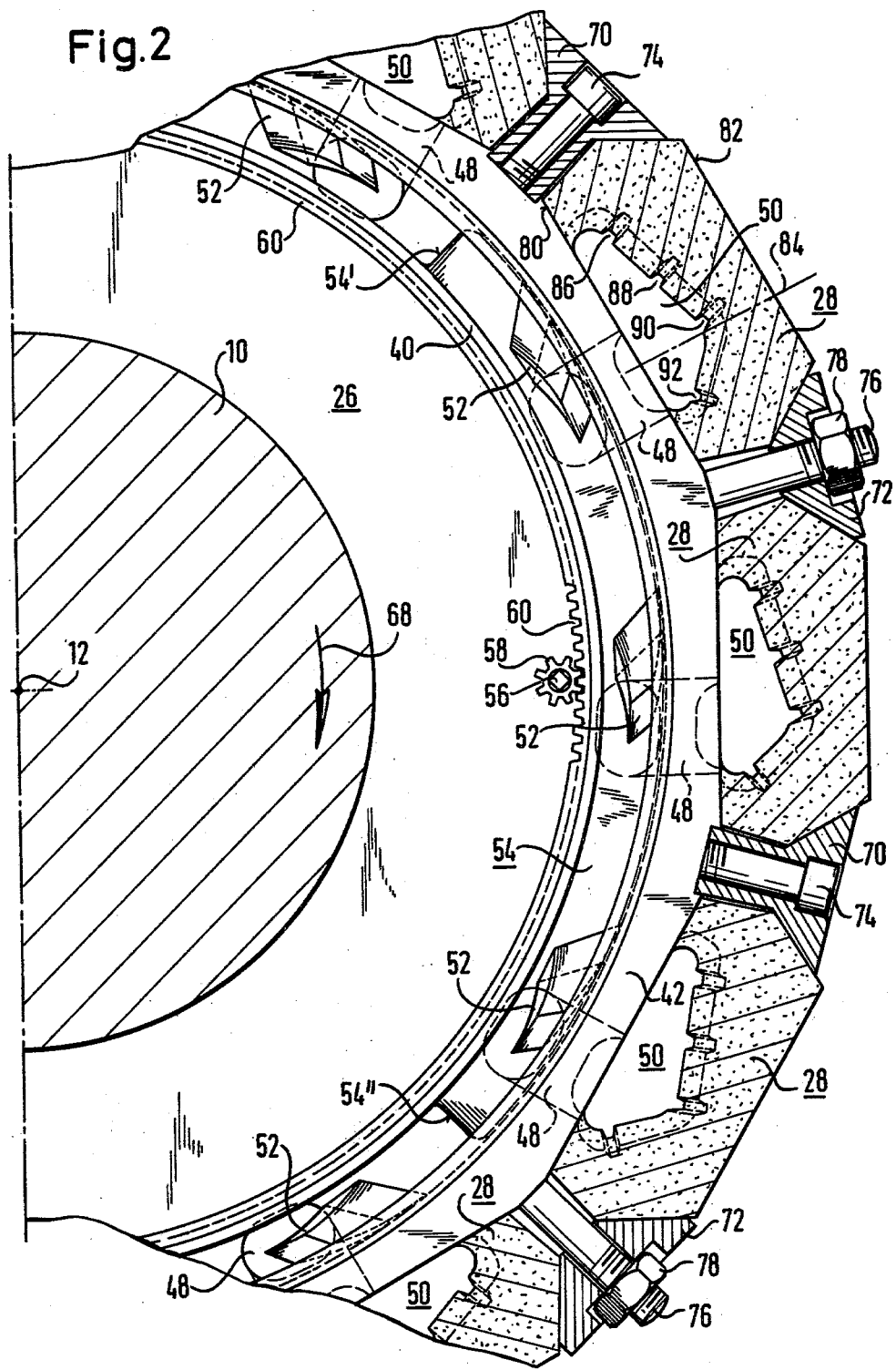
FIG. 2 is a horizontal section through a part of the segment head.

The sectional view shown in FIG. 2 is a horizontal section through the segment head 26 and the grinding segments 28, although parts lying outside the plane of the section are indicated in dashed lines. An arrow 68 indicates the direction of rotation of the segment head 26. The grinding segments 28 are clamped in the circumferential direction on the segment head 26. For this purpose, fixed and detachable clamping pieces 70, 72 are alternately provided. The fixed clamping pieces 70 are connected in an undetachable manner to the segment head 26 by means of bolts 74. The detachable clamping pieces 72 have boreholes which receive bolts which are attached to the segment head and on which nuts 78 are screwed. The grinding segments 28 are flat on the inner surface 80 and on the outer surface 82, and bevelled in triangular shape on the two vertical outer edges so that a space to receive the clamping pieces 70, 72 results.

The pressure chambers 50 which are provided in the grinding segments 28 have, as seen in horizontal cross section in accordance with FIG. 2, in substantially the shape of obtuse triangles, whose base lines lie in the plane of the inner surfaces 80. The corners of the triangle are rounded off and brought inward in an arcuate manner particularly at the transitions into the inner surface 80. The apex line 84 lies in front of the center of the pressure chambers 50 as seen in the direction of rotation. The dashed lines indicate that the pressure chambers 50 widen downward with respect to the plane of the section. In the inner surface of the pressure chambers 50 downwardly extending collection grooves 86, 88, 90, 92, are developed. These collection grooves lead the stream of water into the pressure chambers 50 and furthermore have the advantage that metal chips which are positively entrained by the recirculated cooling water, deposit on their bottom as a result of the centrifugal force. These metal chips therefore do not reach the working surface and it is merely necessary to clean the guide grooves upon the readjustment of partially worn grinding segments.

The water channels 48 are furthermore indicated in dashed line in FIG. 2. It can be seen that these water channels discharge into the front regions of the pressure chambers 50, as seen in the direction of rotation, so that the water, which is subjected to higher circumferential speeds with increasing distance from the axes of rotation 12, is forced by its momentum into the pressure chambers 50. Furthermore the blades 52 are also indicated in dashed lines in FIG. 2. It can be seen that these blades lie behind the water channels 48, as seen in the direction of rotation, and introduce the water into the channels. This feature will be taken up later.

The adjustment mechanism 56, 58, 60 for the sleeve 40, which has already been indicated, can also be noted in FIG. 2, and in the example shown the barrier diaphragm 54 extends from the point 54' to the point 54". As has already been mentioned, the position of the barrier diaphragm 54 is adjustable in the circumferential direction.

Figure 3:
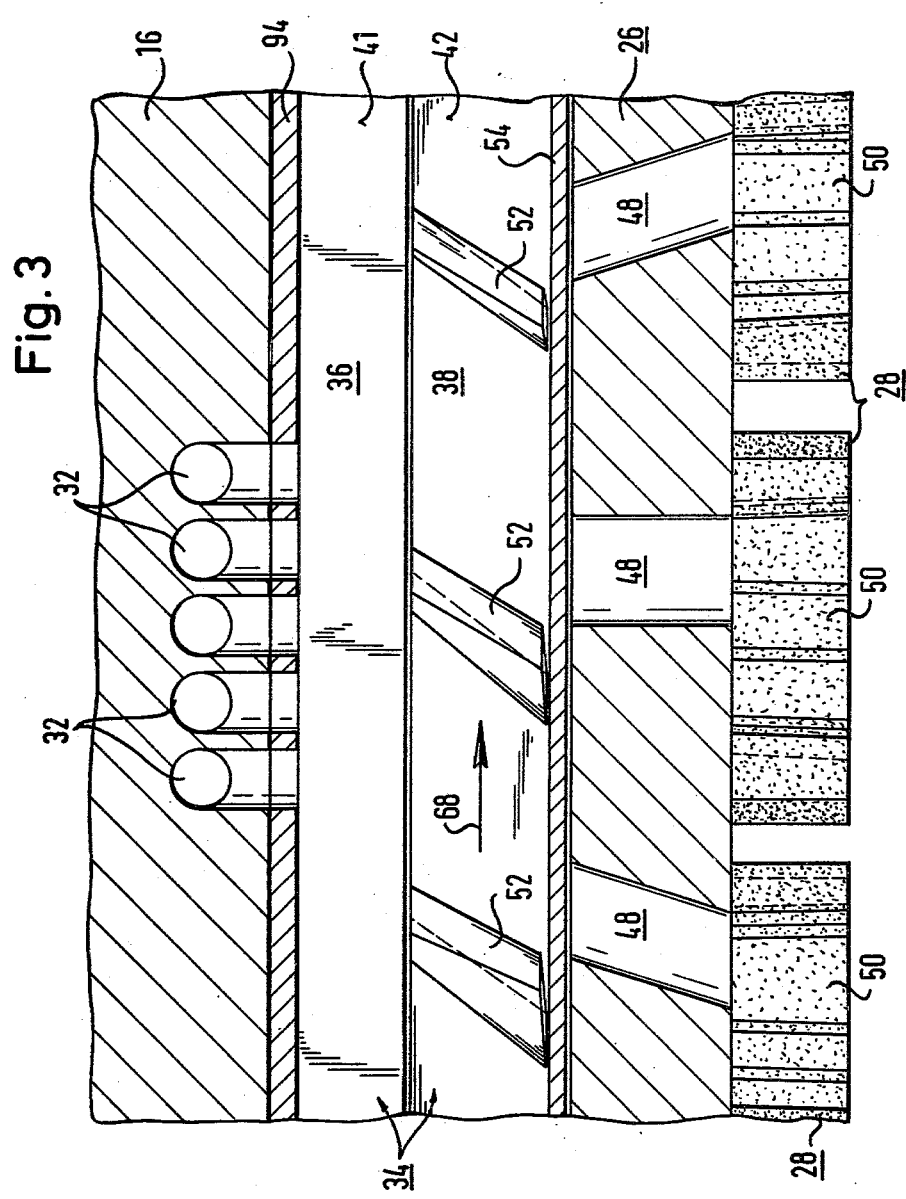
FIG. 3 is a section along the line 3—3 of FIG. 1.

FIG. 3 is a section along the line 3—3 of FIG. 1 and thus a view in the radially outward direction from the annular chamber 34. A plurality of channels 32 pass through the machine part 16 and the cover plate 94 of the protective hood 95, which has also already been shown in FIG. 1 and extends over the segment head 26 and covers it on the top and on the outside. The channels 32 extend vertically downward into the upper annular space 36. The lateral walls 40, 41, of the annular space 36 are fastened to the machine so that the water is not subjected to any forces of acceleration and can distribute itself in an annular shape.

The aforementioned blades 52 are provided in the lower annular space 38. FIG. 3 shows that the blades 52 extend downward opposite the direction of rotation (arrow 68) and obliquely rearwards. In this way the cooling water which is accelerated by the blades 52 in the circumferential direction is forced downward. The blades 52 are located directly behind the water channels 48, as seen in the direction of rotation, so that they force the cooling water into the water channels 48. The blades 52 are somewhat lectern-shaped, as can be noted from FIG. 3. FIG. 3 also shows, in cross section, the barrier diaphragm 54 which covers the water channels 48.

Figure 4:
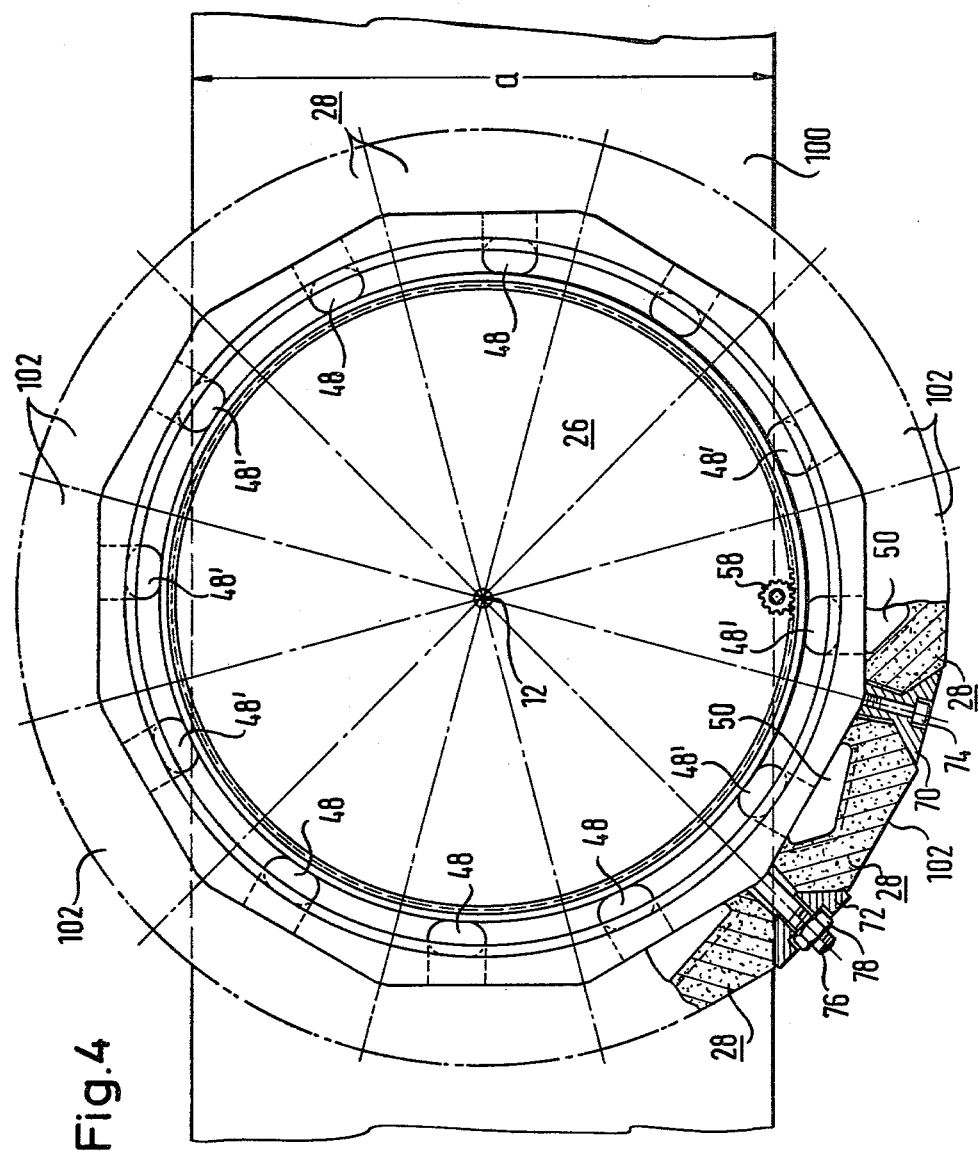
FIG. 4 again shows a horizontal diagrammatic section through the segment head, with indication of a workpiece.

FIG. 4 corresponds essentially to FIG. 2 and need therefore not be explained in detail. In FIG. 4, a indicates the grinding width, which corresponds for instance to the width of a workpiece 100. On both sides of the workpiece 100, in the position shown, three grinding segments 102 and three water channels 48' associated with them are located on the side next to the workpiece 100. These water channels are closed in each case upon the passage of the barrier diaphragm 54, which has not been shown in this figure, so that the cooling water is given off only through the other water channels 48 which lie above the workpiece 100. It may be necessary to move the barrier diaphragm 54 back from the position indicated in FIG. 4 in a direction opposite to the direction of rotation and in this way take into account an "angle of lag" of the water feed.

Figure 5:
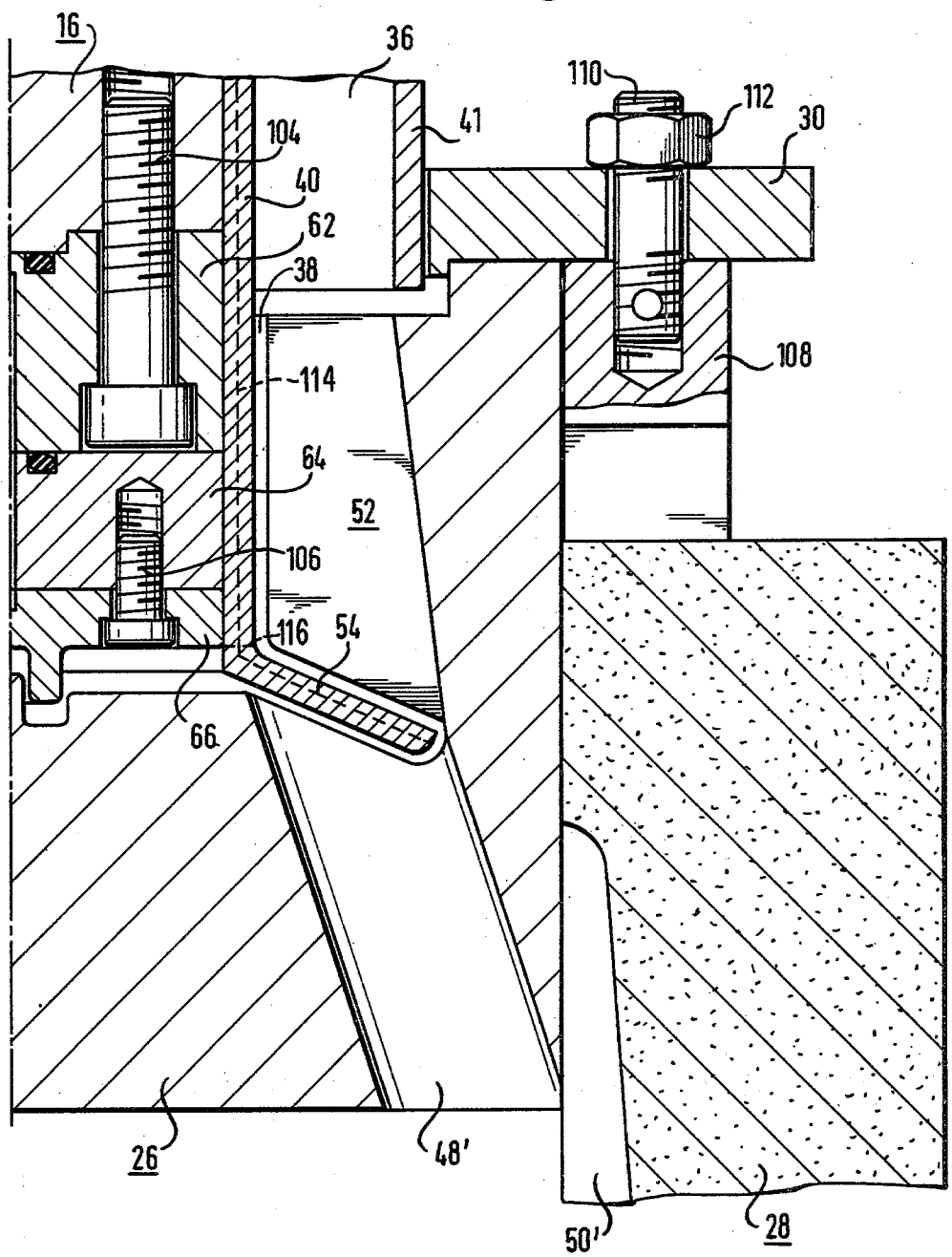
FIG. 5 is a modified partial region of FIG. 1.

FIG. 5 corresponds to the lower right part of FIG. 1 in a different radial sectional plane and with a modification of the water channels 48'. Insofar as the same parts are shown as in FIG. 1, the same reference numbers are used. On the left hand side of FIG. 5 it can be noted that the ring 62 is attached by screws 104 to the stationary machine part 16. The locking ring 64 provided below it is held in its position (in a manner not shown in the drawing) by threaded engagement with the nut 24. The ring 66 is also connected to the lock ring 64 by means of screws 106.

In the position shown in FIG. 5, the grinding segments 28 are not supported directly by the ring 30 but rather on it towards the top via intermediate pieces 108 of T-shaped cross section. Bolts 110 are screwed into the intermediate pieces 108 and the intermediate pieces are clamped by them against the ring 30 with the use of a nut 112.

The pressure chamber 50' in the case of FIG. 5 does not commence at the upper end of the grinding segment 28 but at a distance from the upper end thereof, so that the application against the segment head 26 is improved and a return flow of water as a result of the formation of eddying and the like is prevented.

The water channels 48' in accordance with FIG. 5 extend more steeply downward than in the case of the embodiment of FIG. 1 so that the predominant part of the cross-sectional surface of the water channels 48' intersects the lower surface of the segment head 26 and only slightly, if at all, intersects the outer surface of the segment head. In this way, the result is obtained that the cooling water is conducted as far downward as possible before it enters the pressure chamber 50', so that an excessive amount of water can be prevented from being forced by the centrifugal force in substantially radial direction through the grinding segment 28.

The dotted line 114 shows a further improvement in that two concentric sleeves are provided with barrier diaphragms overlapping each other for adjustment of the length of each region. Dotted line 116 marks the separation between diaphragms and the sleeves.

The diaphragms may be detachably fastened to the sleeve providing for diaphragms of different lengths to be interchanged.

As has already been stated, it is particularly important that the largest portion of the water arrive at the lower end of the grinding segments and pass through the grinding segments and wash them clean, or reach and cool the working surfaces. If in a specific case too much water passes, in the upper region of the grinding segments, radially through the grinding segments as a result of considerable centrifugal forces or very great porosity of the grinding segments, it may be advisable to provide the upper region of the pressure chambers 50, 50' with a suitable lining, for instance a resin coating which prevents, or at least limits, the radial emergence of water. The lining can also be provided merely in partial areas. It should be omitted in the lower region of the grinding segments, for instance, in a strip 20 to 30 mm in width, and preferably be easily detachable so that a corresponding lower strip can be exposed upon the readjustment of worn grinding segments.

What is claimed is:

1. A grinding machine having a rotatable grinding head comprising a plurality of grinding segments arranged in a generally circular alignment around the periphery of the grinding head, said grinding head having an annular chamber therein for receiving a liquid coolant and having a plurality of water channels extending obliquely downward and outward from said annular chamber to the inner side of the grinding segments; and a blocking member comprising at least one barrier diaphragm having the shape of a circular segment for covering the water channels in a region of the grinding head not in contact with a workpiece whereby coolant flow into said region is interrupted.

2. The grinding machine of claim 1, wherein each grinding segment is provided on its inner surface with a pressure chamber, said pressure chamber comprising an obliquely downward and outwardly extending recess having the shape of an obtuse triangle in horizontal section.

3. The grinding machine of claim 1 wherein the position of the blocking member is adjustable to different positions around the circumference of the grinding machine.

4. The grinding machine of claim 1 wherein the barrier diaphragm is arranged on a sleeve which is concentric to the axis of the rotatable grinding head and defines the inside of the annular chamber.

5. The grinding machine of claim 4, wherein the barrier diaphragm is detachably fastened to the sleeve.

6. The grinding machine of claim 4, wherein two concentric sleeves with barrier diaphragms overlapping each other are provided for adjustment of the length of the region not receiving coolant.

7. The grinding machine of claim 1, further comprising a second barrier diaphragm, said barrier diaphragms being provided on diametrically opposite sides of the grinding head.

8. The grinding machine of claim 4, wherein the sleeve is provided on one of its circumferential surfaces with a gear ring section in which there engages a pinion which is turnable for displacing the sleeve with respect to the grinding machine.

9. The grinding machine of claim 1, wherein the annular chamber comprises an upper annular space which is defined on the outside by a sleeve, and a lower annular space which is defined on the outside by an upwardly protruding ring of the grinding head.

10. The grinding machine of claim 9, having a plurality of blades circumferentially distributed on the inner surface of the upwardly extending ring for accelerating the cooling liquid in the circumferential direction.

11. The grinding machine of claim 10, wherein the blades are developed in lectern-shape with rectangular cross section.

12. The grinding machine of claim 10, wherein the blades extend obliquely downward and inward.

13. The grinding machine of claim 10, wherein the blades extend obliquely downward in a direction opposite to the direction of rotation of the grinding head.

14. The grinding machine of claim 9, in which the outer wall of the annular chamber extends obliquely downward and outward, and the water channels extend obliquely downward and outward from the bottom of the annular chamber, wherein the sleeve which forms the outer limit of the upper annular space is cylindrical and the outer wall of the lower annular space extends obliquely downward and outward.

15. The grinding machine of claim 10, wherein each of the blades is located directly behind a water channel as seen in the direction of rotation of the grinding head.

16. The grinding machine of claim 2, wherein the apex line of the pressure chambers lies in front of the center of the pressure chambers as seen in the direction of rotation of the grinding head.

17. The grinding machine of claim 2, wherein the pressure chambers are rounded in the apex line and the legs of the triangle pass with inwardly rounded arcs into the inner surface of each grinding segment.

18. The grinding machine of claim 2, wherein the cross section of the pressure chamber increases uniformly downward.

19. The grinding machine of claim 2, including collecting grooves which extend downward in the inner surface of the pressure chamber in each segment.

20. The grinding machine of claim 2, wherein the means for conducting cooling liquid comprises water channels which discharge in the forward region as seen from the direction of rotation of the grinding head of the pressure chambers.

21. The grinding machine of claim 20, wherein the major portion of the cross-sectional area of each water channel intersects a lower surface of a segment head and a minor portion of the cross sectional area of each water channel penetrates the outer circumferential surface of a segment.

22. The grinding machine of claim 2, wherein the pressure chambers commence at a distance below the upper end of the grinding segments.

23. The grinding machine of claim 2, wherein the pressure chambers are provided on their inner surface, except in a strip of about 20 to 30 mm on the lower edge, with a lining which is at least partially impervious to cooling liquid.

* * * * *